March 6, 1928. 1,661,237
S. W. SHAW
GAUGE WHEEL FOR AGRICULTURAL IMPLEMENTS
Filed Feb. 14, 1927
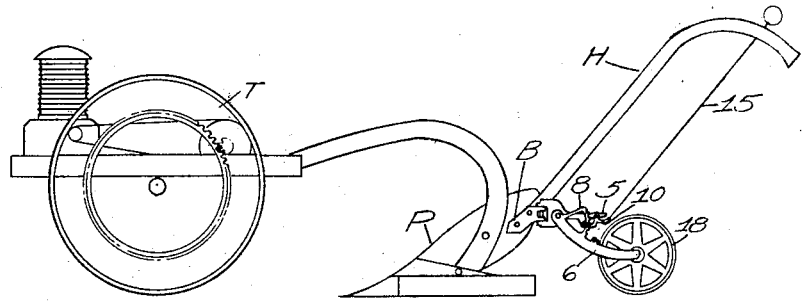
Fig. 1
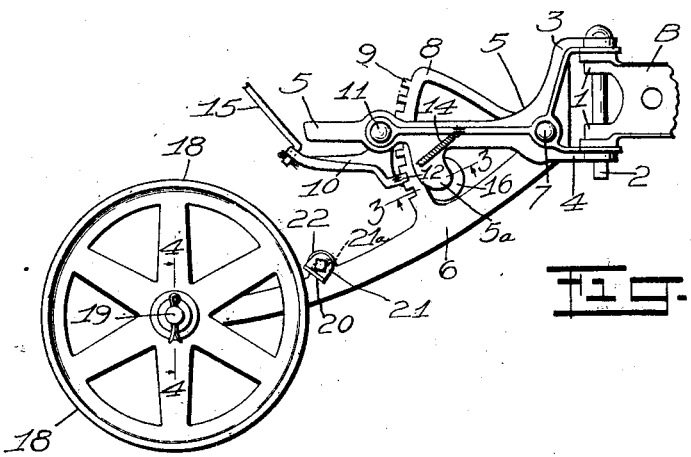
Fig. 2
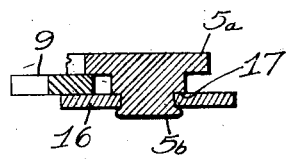
Fig. 3
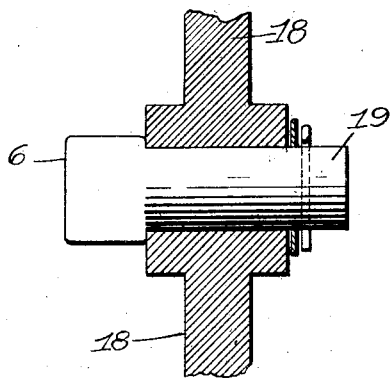
Fig. 4
Fig. 5
INVENTOR
S. W. SHAW
BY *Munn & Co.*
ATTORNEYS Patented Mar. 6, 1928.

1,661,237

UNITED STATES PATENT OFFICE.

STANLEY W. SHAW, OF GALESBURG, KANSAS.

GAUGE WHEEL FOR AGRICULTURAL IMPLEMENTS.

Application filed February 14, 1927. Serial No. 168,196.

My invention relates to improvements in gauge wheels for agricultural implements, and it consists in the combinations, constructions, and arrangements herein described and claimed.

In the operation of agricultural implements such as cultivators, plows, or other similar devices having ground-engaging tools, it is often tiring on the operator to constantly hold these tools to the proper height for most efficient working. In other words, the tools sometimes will dig into the ground and pull the device downwardly, thus necessitating the lifting of the handles so as to bring the tools to the proper position. It is often difficult to change the direction of a device such as a plow while the tool is in the ground, thus necessitating the raising of the tool from the ground in order to head it in the proper position.

An object of my invention is to provide a gauge wheel for gauging the distance to which the tool may enter the ground, thus relieving the operator of the necessity of pulling the tool upwardly from time to time.

A further object is to provide means for quickly adjusting the gauge wheel to the height desired and for securing it in its adjusted position.

A further object is to provide a wheel which serves as a castor and on which the vehicle may be easily turned to one side or to the other, even while the tools are in the ground or when they are raised out of the ground.

Other objects and advantages will appear in the following specification, and the novel features of the invention will be particularly pointed out in the appended claims.

My invention is illustrated in the accompanying drawings, forming part of this application, in which Figure 1 is a view showing a plow equipped with my improved gauge wheel, Figure 2 is a detailed side view of the wheel and the adjusting mechanism, Figure 3 is a section along the line 3—3 of Figure 2, Figure 4 is a section along the line 4—4 of Figure 2, and Figure 5 is a detailed view showing the connection of a spring with a locking tooth.

In Figure 1 I have shown the device as applied to a motor-driven plow, but it will be understood that this is for sake of illustration only and that it might be applied to any agricultural implement of the type. In the drawings, a tractor is indicated in general at T. This is connected to a plow P, having a handle H, which is secured thereto. A bracket B is provided, a portion of which is indicated in Figure 2. The bracket B, as will be observed, has aligned portions 1 which are bored to receive a pin 2. This pin passes through the arms 3 and 4 of a supporting member 5, so as to pivotally mount the supporting member 5 on a vertical axis.

An arm 6 is pivotally mounted at 7 on the support 5 so as to swing in a vertical plane. The arm is provided with a locking quadrant 8, having teeth 9. A bell crank lever 10 is pivotally mounted at 11 on the member 5. This lever has a tooth 12, and an eye 13 is provided integral with the tooth and to this eye one end of a spring 14 is fastened, the other end of the spring being fastened to the support 5. A pull rod or cord 15 is secured to the end of the lever 10 at one end and is pivotally secured to the handle H at the other end.

The support 5 has an extension 5ª provided with a lug 5ᵇ, see Figure 3, which is arranged to extend through a washer 16 that bears on a shoulder 17. Between the extension 5ª and the washer 16, the inner edge of the quadrant 9 is received so that as the quadrant is moved relatively to the support 5 it will be guided in its movement.

The gauge wheel 18 is mounted on a stub shaft 19 carried by the arm 6, as shown in Figure 4.

A mud scraper 20 has a portion 21 which is bolted to an ear 22 carried by the arm 6. The portion 21 has a slot 21ª which permits the adjustment of the scraper toward and away from the gauge wheel. When the bolt is tightened, the scraper will remain in its adjusted position.

From the foregoing description of the various parts of the device, the operation thereof may be readily understood. When it is desired to raise the ground-cutting tools, the rod or cord 15 is pulled, thereby releasing the tooth 12 from the segment 9. The handles are now raised, thus elevating the ground-digging tools while the gauge wheel remains on the ground, and when the proper height is reached, the cord is released, permitting the tooth to enter the locking segment and holding the tool at the desired elevation. In lowering the tool, the reverse operation takes place, since then it is only necessary to release the locking tooth, lower the handles, and permit the locking tooth to again engage the segment.

The construction is such that the tool may be lifted entirely free from the ground and be supported in this condition for easy transportation. I have found that the gauge wheel not only serves to control the distance to which the tool will enter the ground, but it also serves as a fulcrum by means of which the tool may be directed in its course from side to side.

This gauge wheel may be adapted to many forms of farm implements. Of course for heavy implements the wheel might be heavier and larger, but in each instance the operation of a wheel with respect to the raising or lowering of the ground-digging tools is substantially the same.

I claim:

1. The combination with an agricultural implement having a ground-working tool, of a bracket, a supporting member having arms arranged to straddle the bracket, a pivot pin for connecting said arms to said bracket to swing the support in a horizontal plane, an arm pivotally mounted on said support, a locking quadrant carried by the arm, means carried by the support for guiding the arm and the quadrant in their pivotal movement with respect to the support, a bell crank lever pivotally secured to said support and having a tooth arranged to cooperate with said quadrant for locking the latter in a plurality of shifted positions, a spring secured at one end to said support and the other end to the tooth for normally holding the tooth in its locking position, means for moving the bell crank lever to release the tooth, and a gauge wheel pivotally mounted at one end of said arm.

2. The combination with an agricultural implement having a ground-working tool, of a supporting member pivotally mounted thereon to swing in a horizontal plane, an arm pivotally carried by said supporting member to swing in a vertical plane, a quadrant carried by said arm provided with teeth, a bell crank lever pivotally mounted on said supporting member and having a tooth arranged to engage with the teeth of the quadrant for locking the arm in a plurality of adjusted positions with respect to the supporting member, and a gauge wheel carried at one end of said arm.

3. The combination with an agricultural implement having a ground-working tool, of a supporting member pivotally secured thereto, an arm pivotally secured to said supporting member and provided with a locking quadrant, a gauge wheel carried by the arm, and means carried by the support and adapted to cooperate with the locking quadrant for holding said arm in any of a plurality of adjusted positions.

STANLEY W. SHAW.